United States Patent
Boje et al.

(10) Patent No.: US 12,312,120 B2
(45) Date of Patent: May 27, 2025

(54) CLOSURE DEVICE FOR FLEXIBLE CONTAINERS AND A METHOD FOR CLOSING FLEXIBLE CONTAINERS

(71) Applicant: Greif-Velox Maschinenfabrik GmbH, Lübeck (DE)

(72) Inventors: Alexander Boje, Lübeck (DE); Bernd Tillack, Lübeck (DE); Ralf Drews, Lübeck (DE); Alexander Mildner, Lübeck (DE)

(73) Assignee: GREIF-VELOX MASCHINENFABRIK GMBH, Lübeck (DE)

( * ) Notice: Subject to any disclaimer, the term of this patent is extended or adjusted under 35 U.S.C. 154(b) by 0 days.

(21) Appl. No.: 18/338,486

(22) Filed: Jun. 21, 2023

(65) Prior Publication Data

US 2023/0415935 A1    Dec. 28, 2023

(30) Foreign Application Priority Data

Jun. 22, 2022   (EP) ..................... 22180478

(51) Int. Cl.
| | |
|---|---|
| *B65B 7/02* | (2006.01) |
| *B29C 65/00* | (2006.01) |
| *B65B 1/18* | (2006.01) |
| *B65B 51/22* | (2006.01) |
| *B65B 57/02* | (2006.01) |

(52) U.S. Cl.
CPC ........ *B65B 7/025* (2013.01); *B29C 66/43121* (2013.01); *B65B 1/18* (2013.01); *B65B 51/225* (2013.01); *B65B 57/02* (2013.01)

(58) Field of Classification Search
CPC ......... B65B 1/18; B65B 7/025; B65B 51/225; B65B 57/02; B29C 66/43121
USPC ....................... 53/469, 479, 284.7
See application file for complete search history.

(56) References Cited

U.S. PATENT DOCUMENTS

| | | | | | |
|---|---|---|---|---|---|
| 4,549,387 | A | * | 10/1985 | Marshall et al. ....... | B65B 51/32 53/469 |
| 4,688,370 | A | * | 8/1987 | Dighton et al. ........ | B65B 7/025 53/469 |
| 2009/0056282 | A1 | * | 3/2009 | Wadium et al. .......... | B65B 1/18 53/473 |

(Continued)

FOREIGN PATENT DOCUMENTS

| | | | | |
|---|---|---|---|---|
| DE | 19857476 | A1 * | 6/2000 | ............. B65B 7/025 |
| DE | 202021100952 | U1 * | 6/2021 | ............. B65B 7/025 |

(Continued)

*Primary Examiner* — Stephen F. Gerrity
(74) *Attorney, Agent, or Firm* — McGlew and Tuttle, P.C.

(57) ABSTRACT

A closure device (2) for closing a flexible container (4), in particular a valve bag (4), has a welding device (14), a sensor device (20) for acquiring a position of a part of the container (4) to be closed (6), and a control unit (28). The control unit (28) is coupled with the sensor device (20) and with the welding device (14), and is configured to place the welding device (14) in a first position and a second position spaced apart from the first position on the part of the container (4) to be closed (6) by actuating at least one moving device, to detect when at least one of the two positions has been reached via the sensor unit (20), and to actuate the welding device (14) at the respective first and second position to generate a weld seam on the container (4).

12 Claims, 2 Drawing Sheets

(56) References Cited

U.S. PATENT DOCUMENTS

| | | | |
|---|---|---|---|
| 2010/0008603 A1* | 1/2010 | Smith et al. | B65B 51/225 29/527.2 |
| 2012/0096815 A1* | 4/2012 | Vollenkemper | B65B 1/18 53/469 |
| 2012/0222391 A1* | 9/2012 | Wehling | B65B 51/225 141/10 |
| 2018/0044046 A1* | 2/2018 | Yamamoto et al. | B65B 57/02 |

FOREIGN PATENT DOCUMENTS

| | | | | |
|---|---|---|---|---|
| EP | 2008794 A2 * | 12/2008 | | B65B 51/225 |
| EP | 2008794 B1 | 6/2017 | | |
| EP | 3202555 A1 * | 8/2017 | | B65B 7/025 |

* cited by examiner

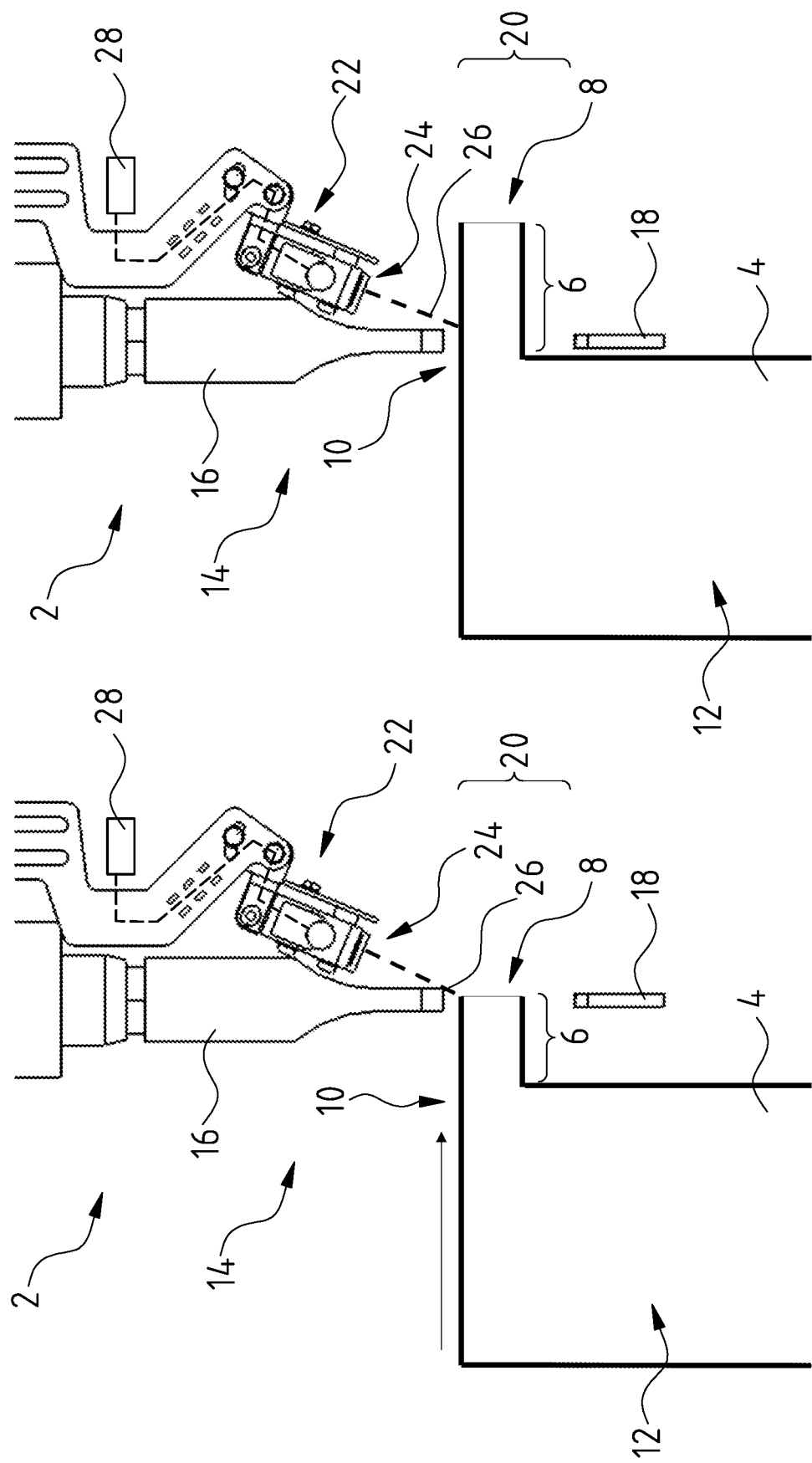

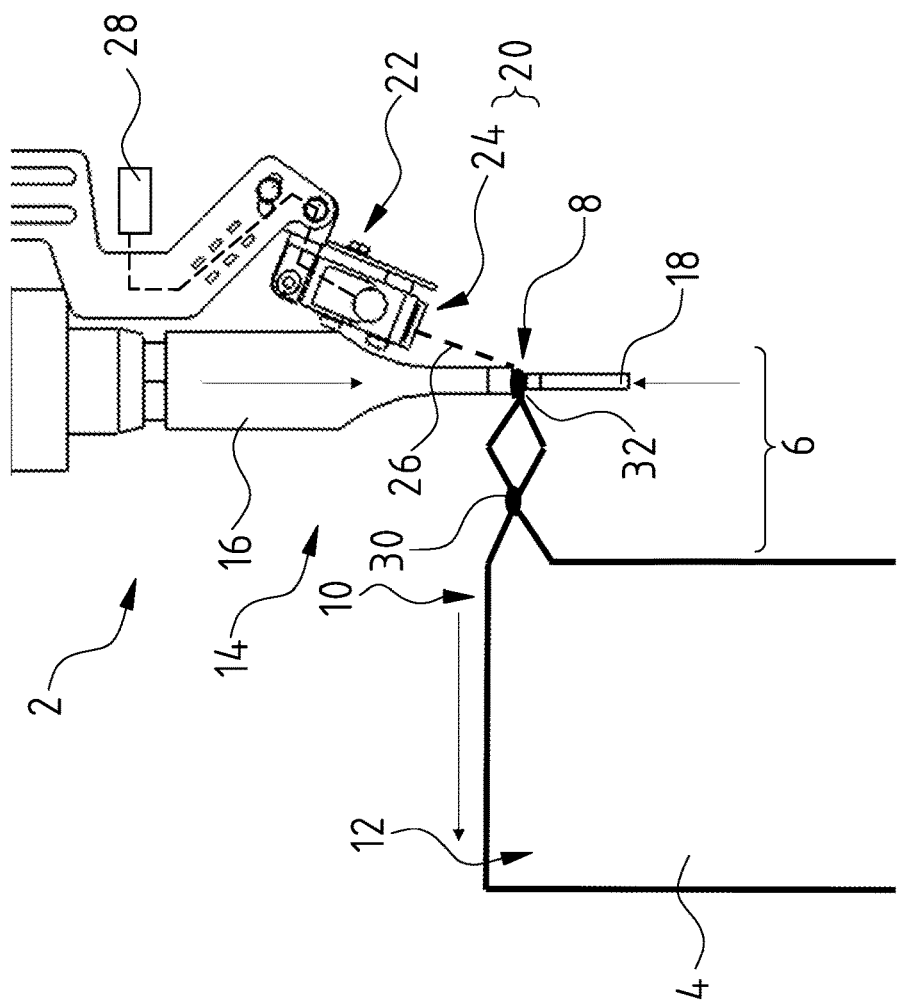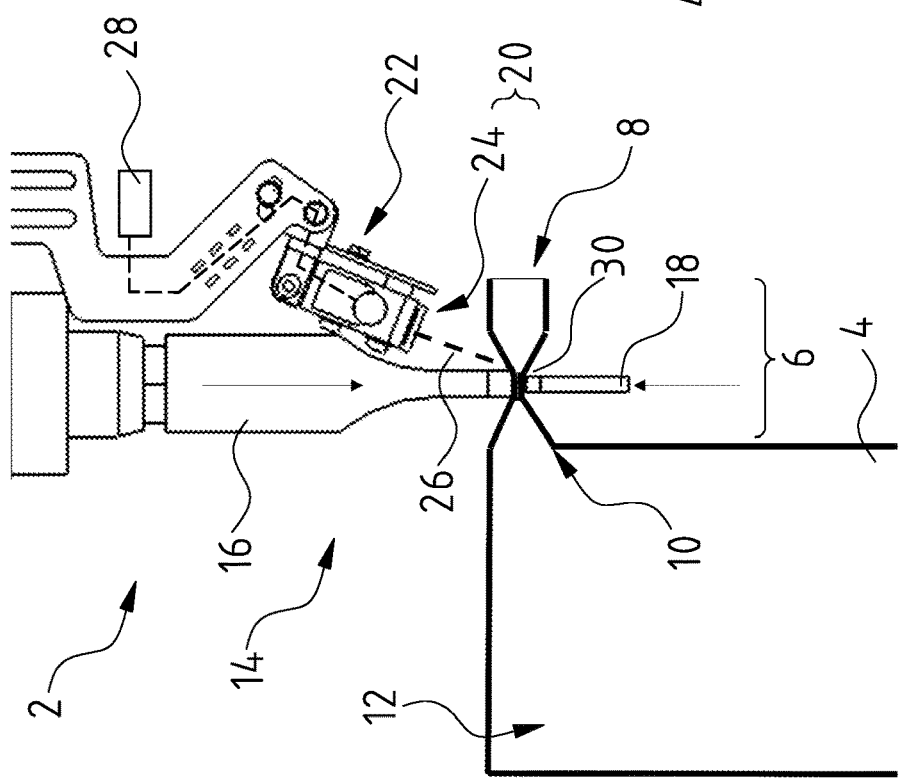

CLOSURE DEVICE FOR FLEXIBLE CONTAINERS AND A METHOD FOR CLOSING FLEXIBLE CONTAINERS

CROSS REFERENCE TO RELATED APPLICATIONS

This application claims the benefit of priority under 35 U.S.C. § 119 of European Application 22180478.4, filed Jun. 22, 2022, the entire contents of which are incorporated herein by reference.

TECHNICAL FIELD

The invention relates to closure of a flexible container, in particular a valve bag.

BACKGROUND

Various filling devices are known from prior art for filling flexible containers, for example valve bags, with powdered filling material. The latter convey the filling material using pressure or by applying a vacuum in a corresponding vacuum chamber. After filling is complete, the container is sealed in the area of a valve, which in valve bags comprises a short, tubular end piece of the bag, via welding, folding or the like, so as to completely surround the filling material, and thereby protect it against outside influences. The valve bag is subsequently relayed to continued processing or transport.

Filling devices such as these constitute prior art, and for example are manufactured and sold worldwide by Greif-Velox Maschinenfabrik GmbH in Lubeck. Prior art comprises vacuum packers, air packers, turbine packers and others, which are used to package a powdered or granular product in a container, and then to close this container. For this reason, devices such as these have a machine frame, in which a closure device is typically also provided apart from a filling device, and can be used to close the filled container. The closure devices usually have an ultrasound welding device, which comprises a horn and an anvil, which enclose and weld a provided section of the respective container. Welded valve bags can have an unwelded protrusion between a weld seam and an outer end of the valve, in which residues of the product filled into the valve bag can remain, and trickle out after the welding process. This can lead to an unwanted accumulation of product residues, or to contamination in the area of the filling device.

SUMMARY

An object of the present invention is to produce an alternative filling device with a closure device or an alternative closure device for closing flexible containers, in which the respective flexible container can be closed in such a way that only the smallest possible quantities of the product filled into the container can leak out after the closure process.

According to the invention, this object is achieved by a closure device for closing a flexible container with features according to the invention. Advantageous embodiments of the device are derived from this disclosure including the following description and the drawing.

The closure device according to the invention for closing a flexible container, in particular a valve bag, has a welding device, a sensor device for acquiring a position of a part of the container to be closed, and a control unit, wherein the control unit is coupled with the sensor device and the welding device, and configured to place the welding device in a first position and a second position spaced apart from it on the part of the container to be closed by actuating at least one moving device, detect when at least one of the two positions has been reached via the sensor unit, and actuate the welding device at the respective first and second position to generate a weld seam on the container.

The device according to the invention can be coupled with a filling device or integrated therein by being arranged on a machine frame of the filling device. As a consequence, the container can be advantageously closed directly after filling is complete. A core idea of the invention involves closing the flexible container with two weld seams spaced apart from each other on the part to be closed. The positions of the two weld seams can be selected in a sensible manner depending on the configuration of the container. In particular if the flexible container is configured as a valve bag with a filling valve or a protruding valve section, the first weld seam could be generated on a bag-side, inner end of the filling valve, and the second weld seam on an outer end of the filling valve spaced apart from the latter. This prevents residual filling material located in the filling valve from leaking out of the container. Placing the second weld seam on an outer end of the filling valve makes it possible to minimize an open protrusion of the filling valve, thereby practically preventing the filling material from trickling out. In addition, the protrusion does not have to be cut off.

The moving device could belong to the closure device and/or to the filling device, in which the closure device is integrated. The control unit can be equipped with a corresponding control routine, which apart from actuating the welding device also comprises actuating the moving device. The moving device could be realized with several variants. In a first variant, the moving device could be provided for carrying and moving the flexible container, and could thus be allocated to a filling device. The moving device could be configured therein to receive an empty container and supply it to a filling spout. After the filling process, the moving device can move the filled container so as to assume the first or second position of the welding device on the part to be welded. It is conceivable that the welding device and sensor device then be arranged largely stationary. In this variant, it might be a good idea to provide a robot arm as the moving device, which can perform complex, even spatial movements, which apart from filling and closing can also comprise placement on a conveyor belt or a pallet, or relaying to a handling device. The control device can correspondingly actuate the robot arm, so as to position the container on the welding device after filling is complete.

In another variant, the moving device could also be part of the closure device. It is then provided that the welding device be moved relative to a supplied filling valve or another part of the container to be closed, at least along a linear trajectory. If the container to be closed is configured like a valve bag, the weld seams are preferably to be generated at two positions spaced apart from each other along the filling valve. A linear guide with a linear drive could suffice for this purpose, so that the path between the first position and the second position can be covered along the filling valve.

A combination of these variants is also conceivable, for example in which the container is moved by means of a first moving device that belongs to the filling device, and the welding device is moved relative to the container by means of a second moving device that belongs to the closure device. The first moving device could essentially be used to absorb the mechanical loads of the container, and the second moving device to precisely position the welding device.

Another core idea of the invention involves the use of a sensor device, which is configured to acquire a position of the part of the container to be closed. The control unit is able to receive sensor data from the sensor device, so that it can actuate the corresponding moving device for assuming the first position and the second position. Depending on the type of container, it may be enough to precisely acquire only one of the two positions. For example, if a first weld seam is desired at a bag-side end of a filling valve and a second weld seam at an outer end of the filling valve, the sensor device could be configured to only acquire the second position. For example, this can be done by acquiring a trailing edge of the filling valve. The first position belonging to the first weld position can be reached via conventional methods, wherein the accuracy with which the first weld seam is placed is not of paramount importance in the mentioned example.

The control unit can be realized as a dedicated control unit. Alternatively thereto, the described function of the control unit could also be integrated into an already present control unit of a filling device solely as a corresponding control routine or as a suitable algorithm.

The sensor device could comprise an optical sensor device, which is configured to acquire a position of the part of the container to be closed using optical methods. For example, this takes place via a light barrier, a camera or a laser-based position and distance detection device.

In an advantageous embodiment, the welding device is a thermal welding device or an ultrasound welding device, wherein the ultrasound welding device has an anvil for placement of the part of the container to be closed, in particular a filling valve of a valve bag, and a horn, which are movably arranged relative to each other. The anvil is configured as a counter bearing for the horn, and used for placement of the filling valve or another corresponding part of the container to be closed. These components are movably arranged relative to each other, so that they can be moved toward each other and made to abut against the container for purposes of the welding process, with the inclusion of the part to be closed. The two components are moved apart from each other to place the part to be closed on the anvil. It can here be advantageous that one of the two components be fixedly arranged, and the other movably arranged, wherein the anvil and the horn could basically also be moveably arranged relative to each other. However, a combined movement of the anvil and horn by means of the aforementioned moving device is independent thereof.

The sensor device could have at least one light barrier. In a simple configuration, a single light barrier could be provided, which is configured to acquire a protruding end of a part of the container to be closed. The light barrier could be positioned on the welding device in such a way that the end of the part to be closed which extends into the welding device no longer interrupts the light beam of the light barrier precisely as soon as the second position has been reached. The use of a reflection light barrier or a light scanner can likewise be advantageous, since the latter is only to be placed on one side of the container, and thus takes up less installation space.

The at least one light barrier could comprise at least one reflection light barrier, which is arranged on the horn side. This is structurally especially advantageous, since the horn is often configured so that it can be traversed vertically in the direction of the anvil, and makes it possible to reliably acquire the position of the valve end protruding there or of another part to be closed, even given a narrow anvil.

Because the respective reflection light barrier is arranged close to or directly on the horn, and after a welding process is typically traversed upwardly along with it out of the welding area, a contamination of the reflection light barrier can at least be largely prevented.

In order to further improve the acquisition of the position of the part of the container to be closed, the at least one light barrier can also have two reflection light barriers, so as to acquire end-side corner areas of the part to be closed. As a result, the remaining protrusion after placement of the second weld seam can be reduced even further.

It is advantageous that the at least one light barrier have an acquisition direction that is arranged at an inclination to a working direction of the welding device. As a result, the at least one light barrier can be arranged remotely from the direct working area of the welding device, for example next to or above a horn, if the welding device is an ultrasound welding device. As a result, a sensor of the at least one light barrier can be spaced apart from the respective part of the container to be closed, and thus better protected against contamination.

The sensor device is preferably rigidly arranged on the welding device. As a result, the position of the part of the container to be closed relative to the welding device can be acquired exactly and directly right on the welding device itself.

The closure device is especially preferably configured to weld containers in the form of valve bags with filling valves as a part to be closed. The filling valves are tubular in configuration. In the filling process, a valve spigot engages into the filling valve. After filling is complete, the filling valve is removed from the valve spigot and the tubular filling valve is welded, wherein the first position is selected in such a way as to generate a first weld seam at a bag-side end of the filling valve, and the second position is selected in such a way as to generate a second weld seam at an outer, free end of the filling valve. A distance between the second weld seam and the outer end is as small as possible, and preferably only measures a few millimeters or less, for example less than 10 mm or preferably less than 5 mm, further preferably less than 2 mm. Accordingly, the first weld seam is placed as close to the bag as possible, i.e., the first position is preferably spaced apart from the bag-side end of the filling valve by less than 10 mm, further preferably by less than 5 mm or 3 mm. The combination of control unit and sensor device enables a precise placement of the part of the container to be closed and the welding device in relation to each other, so as to correspondingly place the first weld seam and/or the second weld seam.

The invention further relates to a filling device for filling a flexible container, in particular a valve bag, with a powdered filling material, with a filling spout provided for introduction into a filling valve of the container, as well as a closure device according to the preceding description.

As mentioned above, it is advantageous for the filling device to have a moving device, which is configured for moving the part of the container to be closed relative to the welding device of the closure device. For example, this can be a robot arm or another mechanical, load-bearing guide.

The invention further relates to a method for closing a flexible container, in particular a valve bag, which involves actuating at least one moving device for placing a welding device in a first position on a part of the container to be closed, generating a first weld seam, actuating the at least one moving device for placing the welding device in a second position on the part of the container to be closed, and generating a second weld seam, wherein a sensor unit for acquiring a position of the part of the container to be closed detects when at least one of the two positions has been reached.

It is preferred based on the method according to the invention that valve bags be welded with filling valves as the part to be closed, wherein the first position is selected in such a way as to generate a first weld seam at a bag-side end of the filling valve, and the second position is selected in such a way as to generate a second weld seam at an outer, free end of the filling valve. The distance between the second weld seam and the outer end is as small as possible, and preferably measures only a few millimeters or less, for example less than 10 mm or preferably less than 5 mm, further preferentially less than 2 mm. Accordingly, the first weld seam is placed as close to the bag as possible, i.e., the first position is preferably spaced apart from the bag-side end of the filling valve by less than 10 mm, further preferably by less than 5 mm or 2 mm. This positioning of the weld seams ensures that no filling material can leak from the bag into the filling valve, and that no residual filling material can leak from the filling valve to the outside.

The invention is described in more detail below based on an exemplary embodiment shown in the drawing.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a schematic view of the closure device in one of several different states while performing a welding process;

FIG. 2 is a schematic view of the closure device in another of several different states while performing a welding process;

FIG. 3 is a schematic view of the closure device in another of several different states while performing a welding process; and FIG. 4 is a schematic view of the closure device in another of several different states while performing a welding process.

DESCRIPTION OF PREFERRED EMBODIMENTS

Referring to the drawings, FIG. 1 shows a closure device 2 for closing a flexible container 4. In this view, the container 4 is a valve bag 4, which has a filling valve 6 configured like a hose or nozzle as the part to be closed, through which a filling spout can be introduced into the container 4, so as to fill in an in particular powdered filling material. After filling is complete, the filling valve 6 is welded so as to close the container 4.

On FIG. 1, the container 4 has already been felled, and a moving device (not shown), for example one configured like a robot arm, moves the container 4 in the drawing plane from left to right in the direction of the closure device 2, so as to close it. The filling valve 6 is here aligned toward the front in the direction of movement, and points to the right in the drawing plane. The filling valve 6 has an outer end 8 as well as an inner, bag-side end 10, which is adjoined by a main volume 12 of the container 4 that can be filled by the filling valve 6. The closure device 2 has a welding device 14, which can be configured like a thermal welding device, or like an ultrasound welding device as exemplarily the case here, which has a horn 16 and an anvil 18 that interacts with it. The horn 16 and the anvil 18 are positioned opposite each other. For example, the anvil 18 is arranged vertically below the horn 16, and has a support surface upwardly directed toward the horn 16. Meanwhile, the horn 16 faces vertically downward toward the anvil 18. A gap 20 into which the filling material 6 can be introduced is formed between the horn 16 and the anvil 18, for example which are movably mounted and drivable relative to each other.

The closure device further has a sensor device 22, which on the horn side is rigidly arranged on the welding device 14. For example, it has a reflection light barrier 24, which has an acquisition direction 26 shown by a dashed line that is arranged at an inclination to a working direction of the welding device. In this view, the working direction can be approached with an imaginary connecting line between the horn 16 and the anvil 18. In other words, the acquisition direction 26 runs at an inclination to a vertical. As a result, the sensor device 22 can be placed next to the horn 16 spaced somewhat apart from the gap 20, so that a certain distance to the filling valve 6 is maintained, and the reflection light barrier 24 is thereby protected against contamination.

The sensor device 22 is provided for acquiring at least one position of the outer end 8 of the filling valve 6. A control unit 28 is exemplarily provided, which can belong to the closure device 2 or to a filling device into which the closure device 2 is integrated. The control unit 28 is coupled with the sensor device 22 and configured to actuate the welding device 14 for generating a weld seam. By acquiring the position of at least the outer end 8 of the container 4, a weld seam can be precisely placed on the outer end 8. Actuating a corresponding moving device allows the control unit 28 to move the container 4 and/or the welding device 14 in such a way that the welding device 14 and the container 4 can assume two predetermined positions, in which a respective weld seam is generated.

FIG. 1 shows the beginning of introducing the filling valve 6 into the gap 20 after the container 4 has been filled. The outer end 8 here reaches the acquisition direction 26 of the sensor device 22. As shown on FIG. 2, the container 4 is initially moved further, so the filling valve 6 protrudes further into the gap 20, and the horn 16 and the anvil 18 are arranged close to the bag-side end 10.

In this position, the anvil 18 and the horn 16 are moved toward each other, as shown on FIG. 3, so that the gap 20 becomes smaller in a vertical direction, which leads to the filling valve 6 becoming enclosed. Activating the horn 16 causes the filling valve 6 to become welded via the generation of a first weld seam 30 close to the bag-side end 10.

The horn 16 and the anvil 18 are subsequently moved apart from each other again, so as to move the container 4, and hence the filling valve 6, from the gap 20 somewhat again. By detecting an end edge of the outer end 8, the sensor device 22 can determine when the outer end is about to reach the gap 20. In this position, which is referred to as the second position within the framework of this disclosure, the relative movement of the container 4 and the welding device 14 is interrupted, and a second weld seam 32 is manufactured. The latter is located as close to the outer end 8 of the filling valve 6 as possible, and thereby reduces a free, open protrusion of the filling valve 6.

While specific embodiments of the invention have been shown and described in detail to illustrate the application of the principles of the invention, it will be understood that the invention may be embodied otherwise without departing from such principles.

REFERENCE LIST

2 Closure device
4 Container/valve bag
6 Filling valve
8 Outer end
10 Bag-side end
12 Main volume
14 Welding device
16 Horn
18 Anvil
20 Gap
22 Sensor device
24 Reflection light barrier
26 Acquisition direction
28 Control unit
30 First weld seam
32 Second weld seam

What is claimed is:

1. A closure device for closing a flexible container, the closing device comprising:
a welding device;
a sensor device configured to acquire a position of a part of the container to be closed; and
a control unit coupled with the sensor device and the welding device, the control unit being configured to place the welding device in a first position relative to the part of the container to be closed and in a second position spaced apart from the first position relative to the part of the container to be closed by actuating at least one moving device, detect when at least one of the two positions has been reached via the sensor device, and actuate the welding device at the respective first and second position to generate a weld seam on the container, wherein the closure device is configured to weld containers in a form of valve bags with filling valves as the part to be closed, wherein the first position is selected to generate a first weld seam at a bag-side end of the filling valve, and the second position is selected to generate a second weld seam at an outer end of the filling valve, wherein no portion of the filling valve extends beyond the outer end of the filling valve.

2. The closure device according to claim 1, wherein the welding device is a thermal welding device or an ultrasound welding device, wherein the welding device has an anvil for placement of the part of the container to be closed and a horn, wherein the anvil and the horn are moveably arranged relative to each other.

3. The closure device according to claim 1, wherein the part of the container to be closed comprises a filling valve of a valve bag.

4. The closure device according to claim 1, wherein the sensor device comprises at least one light barrier.

5. The closure device according to claim 4, wherein the at least one light barrier comprises at least one reflection light barrier, which is arranged on a side of the welding device.

6. The closure device according to claim 4, wherein the at least one light barrier comprises two reflection light barriers, so as to acquire end-side corner areas of a part of the container to be closed.

7. The closure device according to claim 4, wherein the at least one light barrier has an acquisition direction and the welding device having a working direction, the acquisition direction being arranged at an inclination to the working direction of the welding device.

8. The closure device according to claim 1, wherein the sensor device is rigidly arranged on the welding device.

9. A filling device for filling a flexible container with a powdered filling material, the filling device comprising:
a filling spout provided for introduction into a filling valve of the container;
a closure device for closing the flexible container, the closing device comprising: a welding device; a sensor device configured to acquire a position of a part of the container to be closed; and a control unit coupled with the sensor device and the welding device, the control unit being configured to place the welding device in a first position relative to the part of the container to be closed and in a second position spaced apart from the first position relative to the part of the container to be closed by actuating at least one moving device, detect when at least one of the two positions has been reached via the sensor device, and actuate the welding device at the respective first and second position to generate a weld seam on the container; and
a container moving device configured to move the container relative to the welding device of the closure device such that the container moving device moves the container relative to the welding device from a first container position to a second container position after the weld seam is generated with the welding device at the first position.

10. A method for closing a flexible container, the method comprising the steps of:
actuating at least one moving device for placing a welding device in a first position on a part of the flexible container to be closed;
moving the flexible container to a first container position;
generating a first weld seam with the welding device in the first position and with the flexible container in the first container position;
moving the flexible container to a second container position after generating the first weld seam;
after moving the flexible container to the second container position, actuating the at least one moving device for placing the welding device in a second position on the part of the flexible container to be closed;
generating a second weld seam with the welding device in the second position and with the flexible container in the second container position, wherein a sensor unit for acquiring a position of the part of the flexible container to be closed detects when at least one of the two positions has been reached.

11. The method according to claim 10, wherein the flexible container is in a form of valve bag that is welded, with a filling valve as the part to be closed, wherein the first position is selected in such a way as to generate a first weld seam at a bag-side end of the filling valve, and the second position is selected in such a way as to generate a second weld seam at an outer end of the filling valve, wherein no portion of the filling valve extends beyond the outer end of the filling valve.

12. The method according to claim 10, further comprising providing a flexible container moving device, the flexible container being moved to the first container position and the second container position via the flexible container moving device.

* * * * *